March 17, 1959  W. F. NOLDEN ET AL  2,878,368
MANUALLY OPERATED ROTARY SELECTOR SWITCHES
Filed Aug. 2, 1956  5 Sheets-Sheet 1

Inventors.
William F. Nolden.
Clyde F. Robbins.
By W.␣Chyou
Attorney

March 17, 1959 W. F. NOLDEN ET AL 2,878,368
MANUALLY OPERATED ROTARY SELECTOR SWITCHES
Filed Aug. 2, 1956 5 Sheets-Sheet 2

Inventors.
William F. Nolden.
Clyde F. Robbins.
By W. B. Lyon
Attorney

March 17, 1959  W. F. NOLDEN ET AL  2,878,368
MANUALLY OPERATED ROTARY SELECTOR SWITCHES
Filed Aug. 2, 1956  5 Sheets-Sheet 3

Inventors.
William F. Nolden
Clyde F. Robbins
By
Attorney

March 17, 1959 W. F. NOLDEN ET AL 2,878,368
MANUALLY OPERATED ROTARY SELECTOR SWITCHES
Filed Aug. 2, 1956 5 Sheets-Sheet 4

Inventors.
William F. Nolden.
Clyde F. Robbins.
By W. E. Lyon
Attorney.

March 17, 1959  W. F. NOLDEN ET AL  2,878,368
MANUALLY OPERATED ROTARY SELECTOR SWITCHES
Filed Aug. 2, 1956  5 Sheets-Sheet 5

Inventors.
William F. Nolden.
Clyde F. Robbins.
By W. C. Lyon
Attorney

United States Patent Office 2,878,368
Patented Mar. 17, 1959

2,878,368

MANUALLY OPERATED ROTARY SELECTOR SWITCHES

William F. Nolden and Clyde F. Robbins, Milwaukee, Wis., assignors to Cutler-Hammer, Inc., Milwaukee, Wis., a corporation of Delaware Application August 2, 1956, Serial No. 601,810

5 Claims. (Cl. 200—16)

This invention relates to improvements in manually operated rotary selector switches; and more particularly to such switches of either the two-position or the three-position type.

The two-position switches are arranged so as to provide in a simple manner for spring-return of the rotary operating button from one or the other of its two extreme positions, if desired; whereas the three-position switches may likewise be arranged, in a simple manner, to provide for automatic return of the operating button from one or the other, or both, of its extreme positions to its intermediate position.

An object of the invention is to provide a novel form of one-hole mounted adapter for supporting and housing the manually operated selector means and the plural or multiple switching units to be attached thereto for support thereby.

Another object is to provide a cast metal adapter of the aforementioned character having formed therein outer and inner recesses; the outer recess being formed for cooperation with and for limiting rotary movement of the button, and for housing the spring or springs associated therewith; and the inner recess being formed to accommodate the somewhat rounded, but approximately conical, upper ends of the insulating actuators for the respective switches.

Another object is to provide a punched and stamped resilient metal member of substantially circular contour; said member being interlocked with projections formed integrally with the upper end wall of said inner recess, whereby said member is restrained against relative rotation; said member having perforated downwardly projecting opposite end portions, each of which perforations accommodates the cylindrical shank of a metal member, the inner substantially hemispherical end portion of which is adapted to seat within one or another of a series of recesses formed in the otherwise flat upper surface of the cam member, to provide for retention of the latter in any one of a number of different rotary positions.

Another object is to provide such an indexing means whereby either or both of said metal indexing members may be omitted, when spring means is employed to bias the operating button from either or both of its extreme rotary positions to its intermediate, or "off," position.

Another object is to provide for use, alternatively, of various different forms of cam members, and of different forms of coiled torsion springs, according to the particular electrical controlling characteristics desired or required.

Another object is to provide rotary selector switches of various functionally different types utilizing switching units of a known heavy-duty, oiltight type.

Other objects and advantages of the invention will hereinafter appear.

The accompanying drawings illustrate certain embodiments of the invention which will now be described, it being understood that the embodiments illustrated are susceptible of modifications in respect of certain structural details thereof without departing from the spirit and scope of the appended claims.

In the drawings—

Fig. 18 is a top plan view of a slightly modified form of operating button for a rotary selector type of switch, wherein the arcuate peripheral groove in the lower surface of the operating button is displaced clockwise through a rotary angle of ninety degrees, to correspond with the rotary displacement of the cast metal member 27 from the position thereof shown in Fig. 1, for example; thus minimizing the horizontal space requirement of a plurality of such switch mechanisms when mounted upon a panel or the like.

Figure 1:
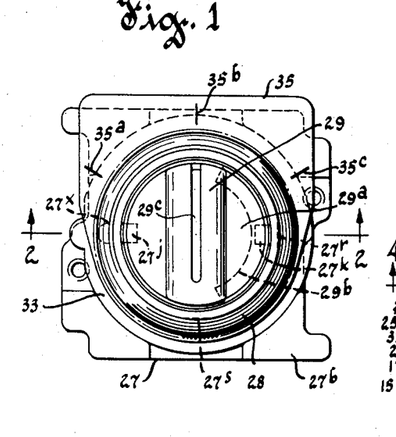
Figure 1 is a top plan view, drawn to one and one-half times normal scale, of a three-position, non-spring-return, rotary selector switch mounting and operating means constructed in accordance with our invention; said switch means being shown as arranged for a minimum vertical space requirement of a group of such switches when mounted in a horizontal row, or rows; the undercut recess on the lower surface of the rotatable operating button and the integral limit stop formed on the retaining ring being shown in dotted lines at the right-hand side of this figure.
Figure 2:
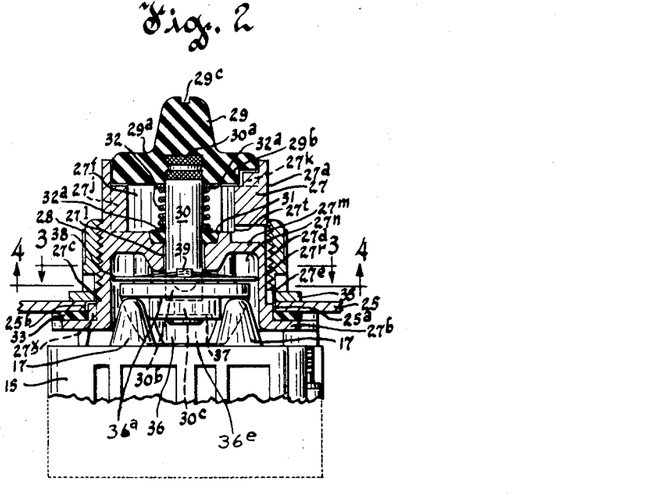
Fig. 2 is a vertical section, on the longitudinal center line 2—2 of Fig. 1, but showing in full lines a fragment of a plural switching unit attached thereto; and showing parts of the switch operating mechanism in side elevation.
Figure 9:
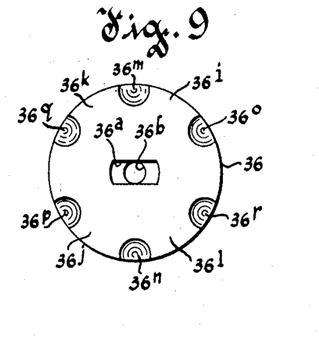
Fig. 9 is a top plan view showing the six positioning indentations formed in the peripheral upper surface portion of three-position cams of the forms shown respectively in Figs. 7, 8, 10 and 11 herein.

Referring first to that embodiment of our invention illustrated in Figs. 1 to 7, inclusive, and Fig. 9, the numeral 15 (Fig. 2) designates the main molded insulation body part of a housing for one pair of switches of the character disclosed and claimed in our prior application, Serial No. 574,828, filed March 29, 1956; said body part 15 having an open lower end (not shown) to which a molded insulation bottom cover member is rigidly and permanently attached, as disclosed in said application, Ser. No. 574,828, to retain the various parts of the plural switch mechanism in assembled relationship to the insulating body part and bottom cover member, as best illustrated in Fig. 2 hereof. Thus the two contactor carrying insulating plungers 17, 17 in Fig. 2 are shown as being those of switches of the normally open type. However, it is to be understood that two switches of the normally closed type might be substituted for those illustrated; or one switch might be of the normally closed type and the other of the normally open type, if desired or required for circuit control as illustrated in detail in Figs. 19 to 23, inclusive.

Figure 14:
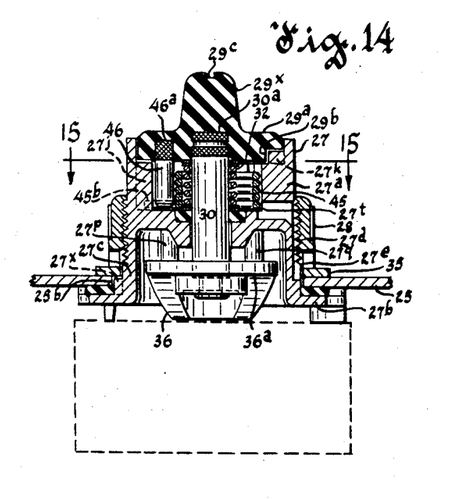
Fig. 14 is a center-line longitudinal sectional view of a three-position type of switch mechanism, wherein the manually operable button and the cam operated thereby are automatically returned, by torsion spring means, to their respective intermediate positions upon manual release of said button.

Fig. 2 illustrates the manner in which one or more pairs of switching units may be attached to a panel 25, formed of metal or other suitable material. As shown, panel 25 is provided with an opening 25$^a$, preferably of substantially circular form to accommodate the substantially cylindrical end portion 27$^a$ of a die casting 27 formed of a suitable metal alloy; the flat lower end or flange portion 27$^b$ of said casting being of substantially rectangular contour, as best illustrated in Figs. 1, 5, 6, 15, 16, 17 and 18. Said portion 27$^a$ of casting 27 is provided at the lefthand side thereof, and near its lower end (Figs. 1, 2, 6, 14, 15, 16 and 17) with an integral outward projection 27$^x$, of the form best illustrated in Fig. 6. As shown in Figs. 2 and 14 said projection 27$^x$ is adapted to fit into a notch 25$^b$ of similar shape formed in panel 25 to positively restrain member 27 against rotary displacement with respect to said panel.

The relatively thick peripheral wall portion 27$^c$ of member 27 extends upwardly for the greater portion of the height of said member, as shown in Figs. 2 and 14; but said portion has a screw-thread 27$^d$ cut therein from the upper limit thereof to a point 27$^e$, in said figures; the purpose of which thread is to accommodate the internally threaded clamping or mounting ring 28; whereby the completely assembled switching unit may be readily attached to a suitably perforated panel 25, or the like.

The outwardly opening recess 27$^f$ in the cylindrical end portion 27$^a$ of member 27 is provided, by the casting operation, with a plurality of integral abutments 27$^g$, 27$^h$ and 27$^i$, of arcuate contour, at one side of said recess (see Fig. 6), and an additional abutment 27$^j$ which is preferably diametrically opposite to the mid-portion of said abutment 27$^h$. The flat outer surfaces of all of said abutments are located in a comon plane, to accommodate the flat lower surface of the circular or disk-shaped integral lower end 29$^a$ of a molded insulating operating button, the diametrically extending, relatively narrow, finger-grip portion of which is designated by the numeral 29 in Figs. 1, 2 and 14.

Formed integrally with and upstanding from the upper surface of arcuate portion 27$^h$ (Fig. 6) is a relatively small, substantially rectangular, stop lug 27$^k$; the opposite sides of which respectively cooperate with the opposite ends of a downwardly facing arcuate groove 29$^b$, which is shown in dotted lines as extending through an arc of one hundred and twenty degrees, in Fig. 1. Thus it may be assumed that the three-position, rotary selector switch shown in Figs. 1, 2 and 14 is in its intermediate, or "off" position; so that upon rotation of knob 29 (Fig. 1) in a clockwise direction through an arc of approximately sixty degrees one circuit commutation will be effected; or, alternatively, upon rotation of knob 29 in a counter-clockwise direction from said "off" position another preselected circuit commutation can be effected.

It is to be understood that if a two-position rotary selector switch is desired or required the same operating button 29 will be employed; the button being then adapted for movement through a rotary angle of one hundred and twenty degrees from each extreme position thereof to the other. In practice one extreme position will ordinarily be the "off" position of the operating button; and, if desired, a coiled torsion spring, of the character hereinafter described may be employed to effect automatic return of the button to its "off" position.

As shown in Fig. 2, handle 29 is molded in any suitable or well known manner to the form thereof illustrated in Figs. 1 and 2, for example; with the grooved and knurled upper end portion 30$^a$ of the cam operating metal shaft 30 rigidly and permanently embedded therein as an insert by the molding operation. We prefer to form the shaft 30 from a suitable length of round steel bar stock, as indicated by the major portion of the length thereof; the cast metal adapter member 27 having a circular opening 27$^l$ formed therein, preferably by the casting operation, to afford rotary clearance for said shaft. Also as shown in Fig. 2, the outwardly opening recess 27$^f$, within which the flange portion 29$^a$ of the operating button is adapted to rotary move in one direction or the other, has its inner end defined by an integral metal diaphragm 27$^m$ to separate said recess 27$^f$ from the inner recess 27$^n$.

Said integral metal diaphragm 27$^m$ has a shallow, preferably circular, recess formed therein around the opening 27$^l$ (Fig. 2), which is adapted to receive with a snug fit a rubber washer 31, which is perforated, as shown, to closely surround the main body portion of shaft 30. A coiled compression spring 32 (with metal washers 32$^a$, 32$^a$ interposed between the respective ends of said spring 32, the lower surface of knob 29, and the upper surface of washer 31) is utilized to effect a predetermined degree of compression of rubber washer 31; thus insuring against entrance of oil, or the like, through said opening 27$^l$ into the switch mechanism. For a like purpose, a flexible rubber gasket 33 of circular contour is interposed between the lower surface of the perforated panel 25 (Fig. 2), around the opening 25$^b$ in the latter, to additionally insurface against entrance or seepage of oil or other liquid inwardly from the outer face of said panel.

As will be noted in Figs. 1, 2, 14 and 18, the finger grip portion of the rotatable button 29 is provided with a relatively narrow groove 29$^c$ extending along the top surface thereof and downwardly along the end thereof which faces toward the relatively wider portion of the identifying plate 35, which may have any proper or desired legends or indicia (such as: "Man.," "Off," "Aut."), for example, applied thereto at the three lines designated by numerals 35$^a$, 35$^b$ and 35$^c$ in Fig. 1. In practice we prefer to coat the walls of both portions of groove 29$^c$ with white enamel, or other suitable material contrasting in color with respect to the color of said button 29.

Figure 13:
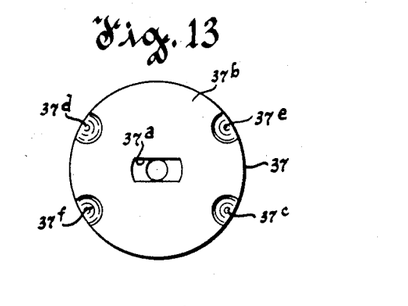
Fig. 13 is a top plan view of a cam like that illustrated in Fig. 12; showing the two pairs of diametrically opposed indentations which are provided for a switch of the two-position type.

Referring again to the operating shaft 30 (see Figs. 2 and 14), it is to be understood that the same is cut away or otherwise formed to provide opposite flat sides, adjacent the lower end portion thereof to produce a form thereof, in cross section, which will quite closely and non-rotatably fit within the recess 36$^a$ in the upper surface of cam member 36 of Figs. 2 and 9, as indicated in dotted lines at 30$^b$ in Fig. 2; or within the correspondingly shaped recess 37$^a$ in the upper surface of cam member 37 of Fig. 13. Also said cam member 36 is provided with a centrally located opening 36$^b$, of circular form in cross section, and preferably of the same diametric size as the space between the opposite side walls of recess 36$^a$, to accommodate, with a close fit, the reduced lower end portion 30$^c$ of shaft 30. Said end portion 30$^c$ of the operating shaft 30 is preferably provided with a downwardly opening central recess, of circular form in cross section (not shown); and the hollow projecting end of said shaft portion 30$^c$ is spun or otherwise upset over the flat lower surface of a perforated metal washer 37, which fits in a flush relationship within a correspondingly shaped recess in the integral, central, downwardly extending portion 36$^c$ of said cam member 36; whereby said cam member 36 and shaft 30 are rigidly and non-rotatably attached to each other.

Figure 3:
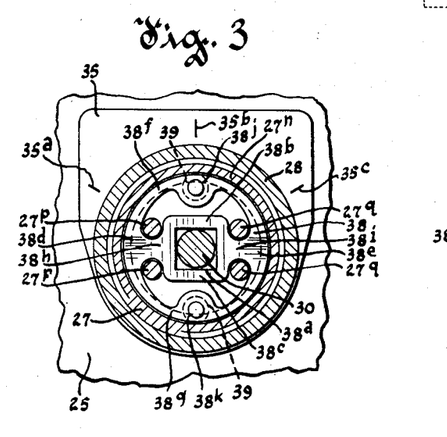
Fig. 3 is a horizontal sectional view, taken on the line 3—3 of Fig. 2, looking in the direction of the arrows, and illustrating our preferred form of indexing means.

However, prior to so uniting shaft 30 and cam member 36 as aforedescribed, the die-cast metal member 27 is inverted, as best illustrated in Fig. 3; and a punched and stamped member 38, of spring-type resilient sheet metal, of circular over-all contour, is inserted into recess 27$^n$; said member 38 having an opening 38$^a$ therein, preferably of square form, to afford clearance for shaft 30. Member 38 in its final form has the parallel portions 38$^b$ and 38$^c$ thereof bent into outwardly opening relatively shallow form, thus providing, in effect, a pair of knife-edge bearings of member 38 upon the flat annular surface 27$^o$ surrounding shaft clearance opening 27$^l$ in cast metal member 27. Also the integral peripheral portion of member 38 is bent inwardly (Fig. 3) at diametrically opposite points, as indicated at 38$^d$ and 38$^e$ in Fig. 3, whereby the diametrically opposite arcuate portions 38$^f$ and 38$^g$ of member 38 will normally tend to assume a substantially coplanar relationship to each other.

As shown in Figs. 2, 3, 5 and 14, two pairs of spaced studs 27$^p$ and 27$^q$ are formed integrally with and extend downwardly from the diaphragm 27$^m$; said respective pairs of studs being located closely adjacent the neck portions 38$^h$ and 38$^i$ of member 38, as best illustrated in Fig. 3, to positively restrain member 38 against relative rotation. The aforementioned arcuate portions 38$^f$ and 38$^g$ of spring member 38 are preferably provided with diametrically oppositely arranged circular openings 38$^j$ and 38$^k$ (Fig. 3), which are respectively adapted to accommodate the cylindrical shank portions of a pair of metal members 39, 39, the heads of which are in the form of a transverse segment of a sphere, as illustrated in Figs. 2, 3 and 4.

Figure 4:
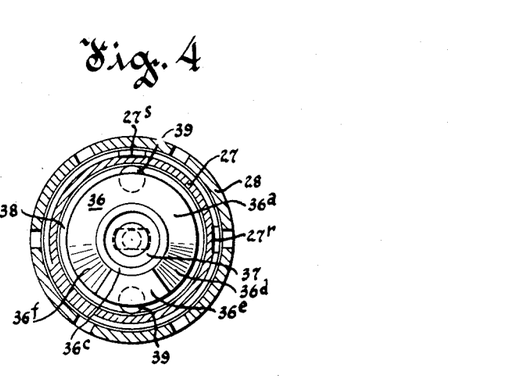
Fig. 4 is a horizontal sectional view, taken on the broken line 4—4 of Fig. 2, looking in the direction of the arrows; showing one form of operating cam, and showing the manner in which the indexing means cooperates with indentations in the otherwise substantially flat upper surface of the cam member.
Figure 5:
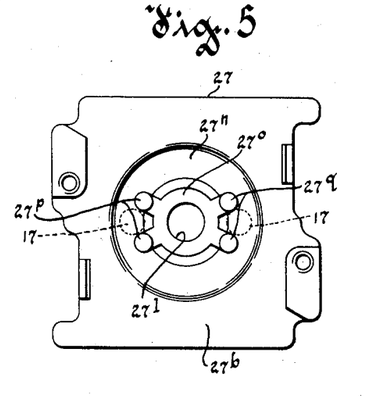
Fig. 5 is a bottom plan view of a cast metal adapter base or support member like that shown in Figs. 1 and 2, showing the integral formation upon the upper end wall of the lower recess in said casting; the diametrically opposed relationship of the upper ends of the pair of switch plungers being indicated by dotted line circles.
Figure 6:
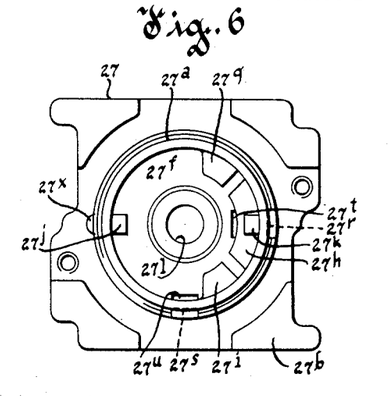
Fig. 6 is a top plan view of the cast metal member shown in Fig. 5, illustrating the form of the projections formed integrally with the bottom wall and the peripheral wall of the upper recess in said casting; the annular recess surrounding the central opening; the leakage vents provided in the bottom wall of said recess, and other structural details.

Here, as in our prior application, Serial No. 574,828, filed March 29, 1956, the die cast member 27 is so formed that its outer recess 27$^f$ is provided with a pair of drainage openings or passages formed therein and leading outwardly therefrom at an angle of ninety degrees with respect to each other, and respectively communicating with the external vertical drainage slots formed in the threaded peripheral portion of member 27; one of said slots being shown at 27$^r$ in each of Figs. 2 and 4, and the other such slot being designated by the numeral 27$^s$ in Fig. 4. Said openings and slots assist in rendering the switch mechanisms, associated with their respective operating buttons, oil-tight and liquid-tight.

Figure 7:
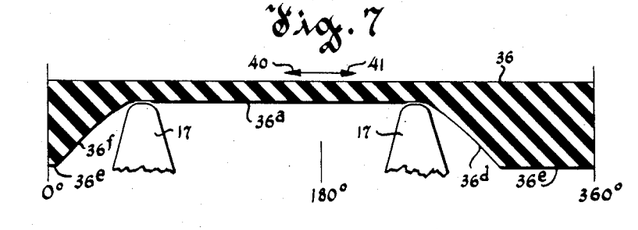
Fig. 7 is a linearly developed view, in section, of one form of cam which may be rigidly attached to the shaft extension of the rotatable operating button of the switch operating assembly; fragments of the upper end portions of the pair of switch operating plungers being shown in their respective upper extreme positions relatively to the cam in one rotary position of the latter; said cam when moved a predetermined degree toward the left effecting movement of the right-hand plunger to its lower extreme position; or, alternatively, when moved a predetermined degree toward the right, effecting movement of the left-hand plunger to its lower extreme position.

Referring more particularly to Figs. 1 to 6, inclusive, it will be noted from Fig. 2 that the molded insulating cam member 36 is identical with that shown in developed form in Fig. 7; and since the respective molded insulating plungers 17, 17 are both closely adjacent to the "low" portion 36$^a$ of cam 36 (Fig. 7) in its intermediate, or "off" position, in a three-position switch operating mechanism, it is to be understood that the switches associated with plungers 17, 17 are of the normally open type, as set forth in our aforementioned prior application Serial No. 574,828, filed March 29, 1956.

Thus, upon rotation of the operating button 29, Figs. 1 and 2, in a clockwise direction (as indicated by the left-hand arrowhead 40 in Fig. 7) the right-hand cam surface 36$^d$ shown in Fig. 7 will substantially immediately start to effect depression of the right-hand switch plunger 17 in said figure, so that during slidable engagement of said cam surface 36$^d$ with the upper end of said right-hand plunger 17 the same will have caused full bridging engagement of the contactor carried thereby with its cooperating pair of stationary contacts (located within the right-hand side of the housing 15 shown in Fig. 2). Moreover, upon full rotation of cam 36 in said direction through an angle of sixty degrees the right-hand portion of the horizontal surface, or plateau 36 (Fig. 7) will overlie the upper end of said right-hand plunger 17 to maintain engagement of its associated bridging contactor with said pair of stationary contacts, pending manual rotation of button 29 in the opposite direction; it being noted that said switch, as illustrated in Fig. 2, does not include any torsion spring means to effect automatic return of operating button 29 from either extreme position to its intermediate "off" position upon manual release of said button 29.

As will be apparent from consideration of Figs. 2 and 7, during the aforementioned clockwise rotation of operating button 29 the low portion 36ᵃ of cam 36 will continuously overlie the upper end of the left-hand plunger 17, so that the switch mechanism controlled by said plunger will remain in its normally open position.

With the normally open switch mechanisms, as shown in Figs. 2 and 7, if the operating button 29 (Figs. 1 and 2) is rotated in a counterclockwise direction through an angle of sixty degrees from its intermediate "off" position, the cam 36 will be moved in the direction indicated by the right-hand arrowhead 41 in Fig. 7, to effect depression of left-hand plunger 17, by cam surface 36ᶠ, so that the switch controlled thereby is closed, and is maintained in closed position, by the aforementioned flat portion, or plateau, 36ᵉ pending manual rotation of said operating button to its intermediate "off" position. As aforeindicated, with a cam like that shown in Fig. 7 there will be no operation of the right-hand plunger 17 during depression of the left-hand plunger 17.

As will be apparent from consideration of the illustrations in Figs. 2, 3, 4 and 9, the punched and stamped resilient metal member 38 is under a predetermined degree of compression of the opposite portions 38ᶠ and 38ᵍ (see Fig. 3), due to engagement of the partially spherical heads of members 39 with the pairs of spaced flat, top surface areas, such as indicated at 36ⁱ, 36ʲ, or 36ᵏ, 36ˡ, in Fig. 9; or due to engagement of said heads of members 39 with the similarly shaped pairs of recesses 36ᵐ, 36ⁿ; 36ᵒ, 36ᵖ, or 36ᵍ, 36ʳ; thus providing a form of snap action means to indicate to the operator when the switch mechanism is in the particular position thereof preselected therefor.

Figure 8:
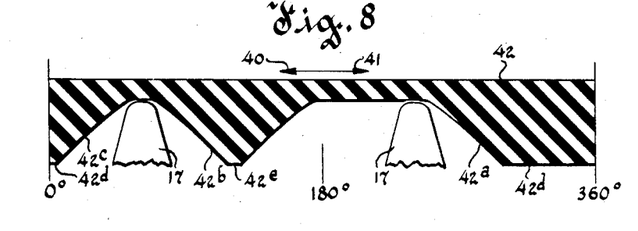
Fig. 8 is a linearly developed view, in section, of another form of cam, wherein the left-hand plunger is moved out of its upper extreme position substantially immediately upon movement of the cam in either direction from the position thereof illustrated; although the right-hand plunger will be operated in the same manner as the right-hand plunger in Fig. 7.

The molded insulating cam chamber, shown at 42 in Fig. 8, is likewise shown associated with a pair of plungers 17, 17, which respectively form parts of switches of the normally open type, as disclosed in our prior application, Serial No. 574,828. With this form of cam 42, upon rotation thereof in a clockwise direction through an angle of sixty degrees, as indicated by the arrowhead 40 in this figure, by a corresponding degree of manual rotation of the operating button 29 when rigidly attached thereto, both the right-hand plunger 17 and the left-hand plunger 17 will at once begin to move downwardly (from the positions thereof shown); due to the simultaneous action of cam surfaces 42ᵃ and 42ᵇ thereon, to effect engagement of their spring-biased bridging contactors with the pairs of spaced stationary contacts respectively associated therewith. At the end of such clockwise movement of cam 42 through an angle of sixty degrees the upper end of right-hand plunger 17 will bear against the right-hand portion of the horizontal surface 42ᵈ in this figure; and the left-hand plunger 17 will rest upon the short horizontal surface portion 42ᵉ of cam 42.

Upon reverse or counterclockwise rotation of cam 42 from its intermediate, or "off," position illustrated, as indicated by the arrowhead 41 in Fig. 8, through an angle of sixty degrees, the right-hand plunger 17 will be unaffected, whereas the left-hand plunger 17 will be moved with a rather quick action to its lower extreme position, by the action thereon of cam surface 42ᶜ; wherein its bridging contactor will engage its associated pair of stationary contacts, and thus complete the desired circuit. The left-hand plunger 17 will then be retained in its depressed position by engagement of its upper end with the horizontal surface portion 42ᵈ of cam 42, as shown at the left-hand side thereof in Fig. 8.

Figure 10:
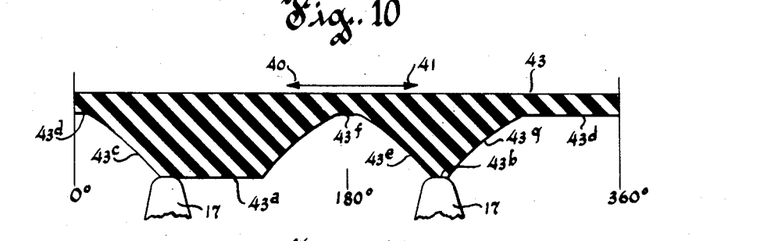
Fig. 10 is a linearly developed view, in section, of still another form of cam for a three-position type of switch.

The three-position switch-controlling circular cam 43, shown in developed form in Fig. 10, is adapted to control the operation of the plungers 17, 17 of a pair of switches of the normally open type; and both of said plungers are shown in the switch-closing positions thereof; the left-hand plunger 17 being shown engaged by the left-hand end portion of the relatively long, flat surface 43ᵃ of cam 43; whereas the right-hand plunger 17 is shown engaged with the relatively short, flat surface 43ᵇ of cam 43. Therefore, upon rotation of cam 43 in a counterclockwise direction (indicated by arrowhead 41) through an angle of sixty degrees as by means of the manually operable button 29 of Figs. 1 and 2, the left-hand plunger 17 will slide along the upwardly extending cam surface 43ᶜ and seat against the flat, low surface portion 43ᵈ of cam 43, at the zero point of rotation thereof, shown at the left-hand side of Fig. 10; and the right-hand plunger 17 will slide along the like upwardly extending cam surface 43ᵉ and seat against the correspondingly low portion 43ᶠ of cam 43; thus providing for interruption of the flow of current through the sets of contacts controlled by each of the plungers 17, 17.

On the other hand, with the parts in the positions thereof shown in Fig. 10, upon rotation of cam 43 in a clockwise direction, as represented by the arrowhead 40 in said figure, through an angle of sixty degrees, the right-hand plunger 17 will slide along the upwardly extending cam surface 43ᵍ and seat against the right-hand portion of the flat, low surface portion 43ᵈ of said cam; thus providing for interruption of the flow of current through the set of contacts controlled by said right-hand plunger 17. However, the left-hand plunger 17 will merely be slidably engaged by the long, flat, high surface portion 43ᵃ of cam 43, and will accordingly maintain the contacts controlled by said left-hand plunger 17 in closed position. As will be understood, of course, the button controlling movement of cam 43 may be rotated in either direction through an angle of sixty degrees from the "off" position thereof; and, alternatively, such button may be quickly rotated from either extreme position thereof to the other.

Upon comparison of cam 43 of Fig. 10 with cam 42 shown in Fig. 8, it will be noted that the various cam surfaces on each of the same, in series with each other, are of like form and dimensions. However, the various cam surfaces of cam 43 in Fig. 10 are merely displaced clockwise through an angle of one hundred and twenty degrees with respect to the positions of the exactly corresponding cam surfaces shown in Fig. 8, as evidenced by the vertical line, representing the normal or intermediate position of each cam, which line is marked "180°" in these figures.

Thus, if it be assumed that the cam 36 shown in Fig. 9 has the parallel-walled recess 36ᵃ arranged in proper rotary relationship for cooperation with a cam like that shown at 42 in Fig. 8, for engagement by the parallel-sided portion of the cam driving shaft 30 (Figs. 2 and 14); then a cam like that shown in Fig. 9 would merely be formed with the parallel-sided recess 36ᵃ displaced clockwise through a rotary angle of one hundred and twenty degrees.

Figure 11:
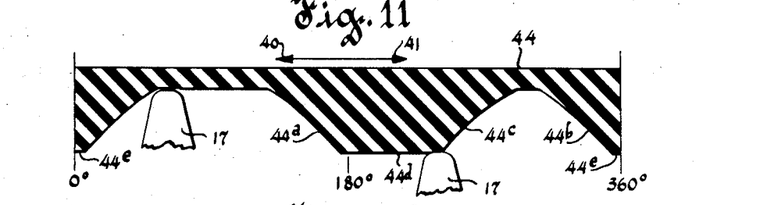
Fig. 11 is a linearly developed view, in section, of a further modified form of cam for a three-position type of switch of the character herein contemplated.

The cam member 44 shown in developed form in Fig. 11 has cam surfaces exactly correspondingly with those of cam 42 illustrated in Fig. 8; and said corresponding cam surfaces in Fig. 11 are designated by reference numerals 44 with exponential reference letters "a," "b," "c," "d" and "e," to indicate likeness thereof to such surfaces on cam 42. In Fig. 11, however, such corresponding cam surfaces are each displaced clockwise through a rotary angle of two hundred and forty degrees, with respect to their positions upon the cam 42 of Fig. 8. Here, again, it is only necessary to mold a cam like that represented in Figs. 8 and 9, but with the parallel-sided recess 36ᵃ displaced clockwise through a rotary angle of two hundred and forty degrees from the position thereof shown in Fig. 9.

Figure 12:
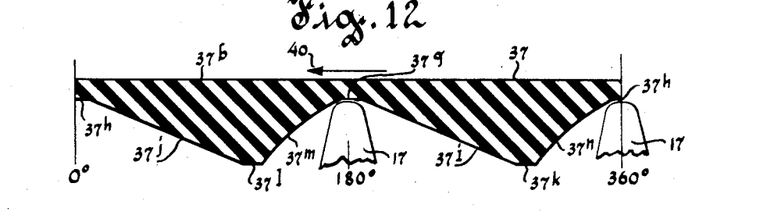
Fig. 12 is a linearly developed view, in section, of a form of cam for use in a two-position, non-spring return type of switch constructed in accordance with our invention.

In Fig. 12 we have illustrated the linearly developed form of a cam 37 for a switch of the two-position type. The type of cam surfaces in Fig. 12 are shown as providing for like positioning of the pair of like plungers 17, 17 for a pair of switch mechanisms of the normally open type; although it is to be understood that a plunger for a normally closed type of switch mechanism could be substituted for either or each of the plungers 17.

Such a two-position switch will be manually movable from either of its two positions to the other, and automatically retained in the position to which it is moved. Accordingly, the top surface 37<sup>b</sup> of cam 37 will be provided with two pairs of diametrically oppositely spaced recesses 37<sup>c</sup>, 37<sup>d</sup> and 37<sup>e</sup>, 37<sup>f</sup>, arranged as shown in Fig. 13; each pair of recesses being respectively adapted to receive and releasably retain the aforementioned spring-biased, partially spherical members 39, 39; as shown, for example, in Figs. 2, 3 and 4.

Thus, in the "off" positions of the switch plungers 17, 17 in Fig. 12, wherein they are adjacent to the low portions 37<sup>g</sup> and 37<sup>h</sup> of cam 37, the resiliently biased members 39, 39 would be engaged with the recesses 37<sup>c</sup> and 37<sup>d</sup> in Fig. 13. Then upon clockwise rotation of cam 37 (by operating button 29) through an angle of one hundred and twenty degrees, the members 39, 39 would be moved into engagement with the diametrically oppositely spaced pair of recesses 37<sup>e</sup> and 37<sup>f</sup>; but subject to release and return to said "off" position upon manual rotation of the button 29 in a counterclockwise direction through an angle of one hundred and twenty degrees. During such clockwise rotation of cam 37 (as indicated by arrowhead 40 in Fig. 12) through an angle of one hundred and twenty degrees, the left-hand and right-hand plungers 17, 17 would be gradually depressed, by engagement therewith of the relatively long, angular cam surfaces 37<sup>i</sup> and 37<sup>j</sup>, respectively; until cam 37 came to rest, with the short horizontal cam surfaces 37<sup>k</sup> and 37<sup>l</sup>, respectively, overlying the left-hand and right-hand plungers 17, 17, to retain both of the same in their depressed, or contact-bridging, positions. The surfaces 37<sup>m</sup> and 37<sup>n</sup> would not be engaged by the plungers 17, 17 in a switch of the character just described.

Figure 15:
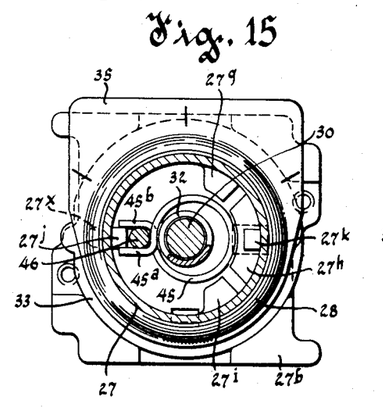
Fig. 15 is a transverse section, taken on the broken line 15—15 of Fig. 14, illustrating the use of a torsion spring with two relatively long straight end portions, whereby the operating button and the parts non-rotatably attached thereto are automatically returned to their intermediate or "off," position upon manual release of the handle after rotation thereof in either direction.

The modified form of switch mechanism illustrated in Figs. 14 and 15 is of the three-position type, but is provided with means, including a coiled torsion type spring 45, the straight, outwardly projecting upper and lower end portions 45<sup>a</sup> and 45<sup>b</sup> of which are biased toward and beyond each other, under a preselected degree of torsion, afforded by the intermediate coils of spring 45. Said straight end portions 45<sup>a</sup> and 45<sup>b</sup> are inherently restrained against any such movement beyond each other, by engagement of the same with the respective opposite sides of a metal rod or stud 46 of circular cross section, the milled, or otherwise roughened, upper end portion 46<sup>a</sup> of which is molded as an insert within the lower circular portion 29<sup>a</sup>, as shown, of the rotary operating button 29<sup>x</sup>, which is otherwise identical with the operating button 29 aforedescribed, and bearing corresponding numerals of reference, 29<sup>a</sup>, 29<sup>b</sup> and 29<sup>c</sup>, as in Figs. 1 and 2.

Said straight end portions 45<sup>a</sup> and 45<sup>b</sup> likewise overlap, and normally engage, opposite vertical sides of the aforementioned stop lug 27<sup>j</sup>, formed integrally with the cast metal member 27, as shown in Fig. 15, and as indicated in dotted lines at 45<sup>b</sup> in Fig. 14.

It follows that upon clockwise rotation of operating button 29<sup>x</sup> (Fig. 14) through an angle of sixty degrees the upper end of the arcuate recess 29<sup>b</sup> formed in the lower face of round portion 29<sup>a</sup> thereof (as in Figs. 1 and 2, for example) will engage the adjacent side of integral stop lug 27<sup>k</sup>, after cam 36 has effected depression of the left-hand plunger 17 (omitted from Fig. 14, but shown in Fig. 2). Moreover, upon manual release of button 29<sup>x</sup> (Fig. 14) the aforementioned straight end portion 45<sup>b</sup> of torsion spring 45 will act immediately to effect return of the cam member, 36 for example, to its intermediate, or "off" position. The other straight end portion 45<sup>a</sup> will act in a like manner, to effect return of the plunger-operating cam, such as 36, to its intermediate position, after rotation thereof in a counterclockwise direction through an angle of sixty degrees, upon manual release of button 29<sup>x</sup>.

As will be apparent from consideration of Figs. 14 and 15; when the operating button 29<sup>x</sup> of a three-position switch operating mechanism is arranged to be automatically returned to its intermediate position from each end position thereof, the resilient metal member 38 and members 39, 39 (of Figs. 2 and 3) will be omitted; thus insuring rapid return of the cam and operating button to their normal intermediate positions, respectively, upon manual release of said button, after movement of the same through an angle of sixty degrees in either a clockwise or a counterclockwise direction from said intermediate position.

Figure 16:
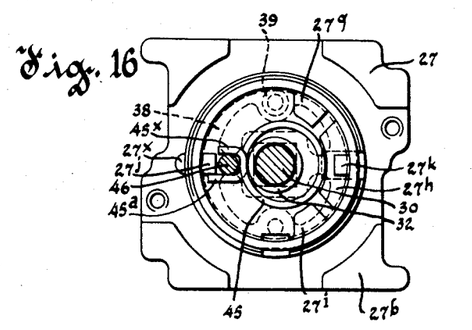
Fig. 16 illustrates the use of a modified form of torsion spring, having one short end and one long end, so that the operating button and the parts attached thereto will be returned automatically to their intermediate, or "off," position upon manual release of the handle after rotation thereof in a clockwise direction.

If the arrangement is such, as shown in Fig. 16, that the button 29<sup>x</sup> is spring-returned to its intermediate position only when the button is rotated clockwise through an angle of sixty degrees, immediately upon manual release of said button; then the resilient metal member 38 aforedescribed, will be employed; but only one metal member 39 is preferably employed, as shown in dotted lines, for cooperation with a single intermediate depression, like that shown at 36<sup>m</sup> in Fig. 9, upon manual release of button 29<sup>x</sup> after rotation of the same in a counterclockwise direction through an angle of sixty degrees. Thus it will be noted that the straight end portion 45<sup>a</sup> of spring 45 in Fig. 16 is of sufficient length to insure engagement thereof with the lower side of the integral abutment 27<sup>j</sup>; whereas the other arm is shortened, as shown at 45<sup>x</sup>, so as to clear said abutment 27<sup>j</sup> upon counterclockwise movement of the button 29<sup>x</sup> through an angle of sixty degrees. As will be apparent from Fig. 16, the coiled torsion spring 45 is free to move bodily with pin 46 upon such counterclockwise rotation of said operating button 29<sup>x</sup> through an angle of sixty degrees.

Figure 17:
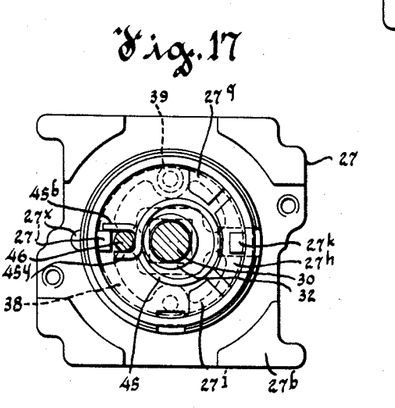
Fig. 17 illustrates the use of a reversely arranged torsion spring of the aforementioned character, whereby the operating button and the parts attached thereto are returned to the intermediate positions thereof illustrated, after manual release of said button following movement thereof in a counterclockwise direction.

Conversely, in Fig. 17 the straight end portion 45<sup>b</sup> of spring 45 is of sufficient length to insure engagement thereof with the upper side of the abutment 27<sup>j</sup>; whereas the other arm is shortened, as shown at 45<sup>y</sup>, so as to clear abutment 27<sup>j</sup> upon clockwise movement of the button 29<sup>x</sup> through an angle of sixty degrees from the normal, or intermediate, position thereof; said spring 45 being free to move bodily with handle 29<sup>x</sup> in said clockwise direction through an angle of sixty degrees.

In all forms of the devices herein disclosed (as in our prior application aforementioned) the outer recess 27<sup>t</sup> of cast metal member 27 is provided with a pair of drainage openings 27<sup>t</sup> and 27<sup>u</sup> (Figs. 2, 6 and 14); to insure against likelihood of water, oil or other liquid entering the switch chambers.

Figure 18:
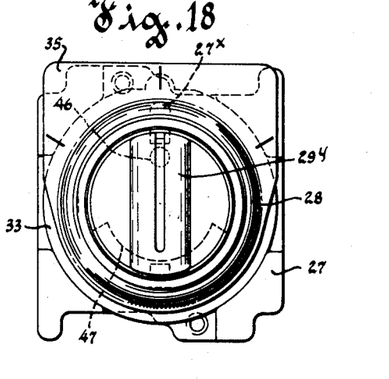
Figure 19:
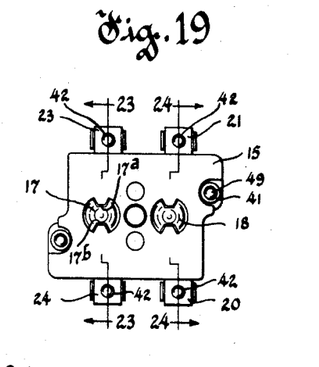
Fig. 19 is a top plan view, actual size, of a two-circuit switching unit, in which the left-hand actuator 17 is adapted to control a switch of the normally open type, as best illustrated in Fig. 23; and the right-hand actuator 18 is adapted to control a switch of the normally closed type, as best illustrated in Fig. 24; the wiring terminal screws 42 being shown attached to the respective terminal members 20, 21, 23 and 24.
Figure 20:
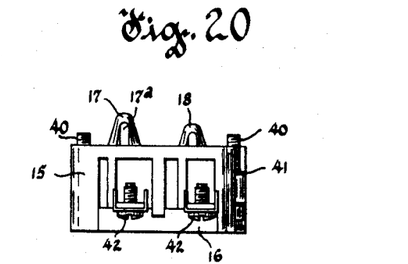
Fig. 20 is a side elevational view of the switching unit shown in Fig. 19, looking toward the lowermost side in said last mentioned figure; the greater degree of projection of the left-hand (normally open type of contactor) actuator being best illustrated in this figure and in Fig. 23.
Figure 21:
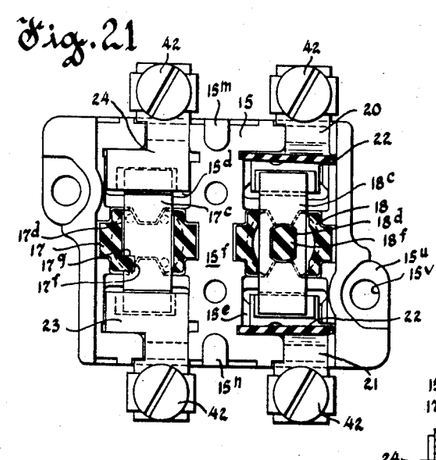
Fig. 21 is a horizontal sectional view of a plural switching unit like that shown in Figs. 19, 20 and 22, illustrating the differences in form and arrangement of the parts for the normally-open and the normally-closed types of switch mechanisms, and the means affording proper support for said parts.
Figure 22:
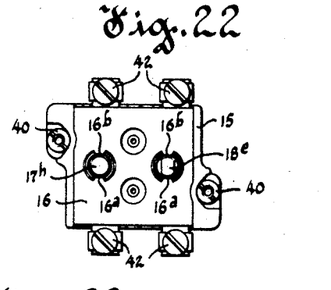
Fig. 22 is a bottom plan view of the switching unit illustrated in Figs. 19, 20 and 21.

In the form of our invention illustrated in Fig. 18 the cast metal member 27 is shown with a clockwise rotary displacement through an angle of ninety degrees, as compared with the showing of the device illustrated in Fig. 1, for example. Thus, whereas the mounting of Fig. 1 affords a minimum space requirement for a plurality of the switches herein disclosed when they are in a vertical line, or lines; the arrangement of Fig. 18 similarly affords a minimum horizontal space requirement for any number of said switching devices when mounted in a horizontal line or lines. The only structural change required to provide this feature is that the rotary operating button 29<sup>y</sup>, if of the non-spring-return type shown in Figs. 1 and 2, will be initially molded with the arcuate peripheral groove 47 displaced clockwise through a rotary angle of ninety degrees from the position of groove 29<sup>b</sup> shown in Fig. 1. When the switch is of the spring-return type, from either or both extreme positions of the operating button, the latter will additionally have molded therein the pin or stud 46, as indicated in dotted lines; such a pin being shown in full lines in Figs. 14, 15, 16 and 17; and being adapted to function in the several manners aforedescribed.

Figure 23:
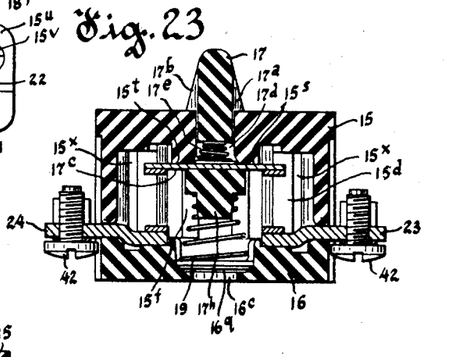
Fig. 23 is a sectional view, on the broken line 23—23 of Fig. 19, showing the movable parts of the normally open type of switch in circuit interrupting position.

Referring now to the switch units disclosed in Figs. 19 to 24, inclusive, the numeral 15 designates the main molded body part of a housing for one pair of switches of the character herein contemplated; and the numeral 16 designates the molded insulating bottom cover member; it being noted that in these figures of the drawings one of the switches of the pair is shown as of the normally open type and the other switch is shown as of the normally closed type. As aforeindicated, however, the two like sets of insulating housing members 15 and 16 may each be employed to house either two switch mechanisms of the normally open type, as shown in Fig. 23, or two switch mechanisms of the normally closed type, shown in Fig. 24; or one switch of each type; the contactor-actuating plunger 17 and contactor 17c of the normally open type of switch shown in Fig. 23 differing in respect of certain structural details from the plunger 18 and contactor 18c of the normally closed type of switch shown in Fig. 24.

More particularly describing the normally open type of switch mechanism shown in Fig. 23, it will be noted that the molded insulating plunger 17 is provided on opposite sides of the approximately conical upper end portion thereof with a pair of like, parallel vertical grooves 17a and 17b, which accommodate and are guided by the integral inward projections 15a, 15b on the walls of the pair of like substantially circular openings 15c, 15c provided in the upper end wall of the main switch housing member 15, Figs. 2, 19, 20 and 23.

Figure 24:
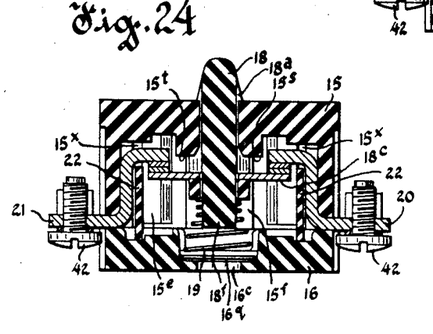
Fig. 24 is a similar sectional view, on the broken line 24—24 of Fig. 19, showing the movable parts of the normally closed type of switch in circuit completing position.

Said two like switching chambers, generally designated by the numerals 15d and 15e (Figs. 21, 23 and 24), are separated by a middle wall or barrier 15f formed integrally with member 15 (see Fig. 21); for cooperation with the insulating bottom cover member 16 (see Figs. 23 and 24).

Member 16 is provided with a pair of like substantially circular openings 16c, which are alined with, but of slightly smaller diameter than, the aforementioned openings 15c in member 15. Member 16 is further provided with pairs of integral inward projections 16a, 16b, which are approximately alined with, but slightly shorter than, the aforementioned projections 15a, 15b on member 15.

As will be apparent from Fig. 23, if a normally open type of switch mechanism is to be assembled in either one or both of the switch chambers 15d and 15e in member 15, an insulating carrier member 17, having the spring-biased bridging contactor 17c assembled with respect thereto, is inserted into the switching chamber, with member 15 inverted from the position thereof shown in Fig. 23, so that member 17 will be temporarily maintained in the position illustrated, by the effect of gravity. Prior to such insertion of member 17, however, the normally open type of bridging contactor is inserted into the substantially rectangular transverse opening 17d provided in said member in the following manner. The coiled spring 17e, of frusto-conical form, is applied to the upper surface of contactor 17c and then temporarily compressed, manually or otherwise, to permit insertion of both contactor 17c and spring 17e into opening 17d, and at a predetermined angle to the side walls of said opening 17d.

As also shown in Fig. 23 the plunger carrying the contactor 17c of the normally open type of switch mechanism is provided with a substantially cylindrical, centrally located, downward projection 17h formed integrally with the flat lower surface thereof; and a relatively long coiled spring 19 of substantially frusto-conical form has its reduced upper end portion surrounding projection 17h and bearing against said flat lower surface of member 17. Assuming attachment of bottom cover member 16 to housing member 15, the enlarged lower end portion of spring 19 will be seated against the upwardly facing circular ledge 16q, which surrounds the particular opening 16c which may happen to be alined therewith.

As shown in Fig. 23 the plunger 17 carrying the contactor 17c of the normally open type of switch mechanism is provided with a substantially cylindrical, centrally located, downward projection 17h formed integrally with the flat lower surface thereof; and a relatively long coiled spring 19 of substantially frusto-conical form has its reduced upper end portion surrounding projection 17h and bearing against said flat lower surface of member 17. Assuming attachment of bottom cover member 16 to housing member 15, the enlarged lower end portion of spring 19 will be seated against the upwardly facing circular ledge 16q, which surrounds the opening 16c alined therewith; it being assumed, of course, that the plunger 18 and the other parts of the right-hand (normally closed) switch mechanism (Figs. 20 and 24), will also be properly assembled with respect to housing 15 before attachment to the latter of the bottom cover member 16. As will be apparent, the alined lugs or projections 16a, 16b within the respective openings 16c, 16c in said bottom cover member 16 (Fig. 22) are arranged to accommodate and guide the lateral vertical grooves in the conical upper end portions of either a plunger 17 or a plunger 18 positioned therebelow, and attached thereto by screws 40, as aforedescribed.

We claim:

1. A manually operated cam-type rotary selector switch mechanism, comprising a one-piece metal adapter member having an outwardly opening recess and an inwardly opening recess, said adapter member having a wall formed integrally therewith defining the inner ends of the respective recesses, said wall having a central circular opening therethrough, a molded insulating operating member rotatably mounted within said outwardly opening recess and having a relatively narrow finger-grip portion formed integrally therewith and projecting outwardly therefrom to facilitate manual rotary movement thereof in one direction or the other throughout a predetermined range, said insulating operating member having a preformed metal shaft rigidly and permanently attached thereto and as an incident to molding of said member, said metal shaft projecting inwardly through and beyond said wall opening, a portion of said shaft extending inwardly beyond said wall being of reduced non-circular form in transverse cross section, a molded insulating cam member of circular contour having a substantially flat outer surface, said outer surface having a recess formed therein to accommodate with a close fit said shaft portion of non-circular form in tranvserse cross section to afford a driving connection between said shaft and said cam member, said outer surface of said cam member having a plurality of pairs of diametrically opposed relatively shallow recesses formed therein adjacent to the perpiheral edge thereof to provide for indexing, a punched and stamped, substantially circular resilient sheet metal member having integral outwardly offset portions thereof interposed under compression between the outer surface of said cam member and the central portion of the end wall of said inwardly opening recess in said adapter member, said sheet metal member having a pair of diametrically opposed openings formed therein adjacent to the periphery thereof, a pair of metal pins the shanks of which extend upwardly through said openings respectively, the inwardly extending convex heads of which are adapted to seat within the respective pairs of diametrically opposed recesses in said cam member, means formed integrally with the lower end of said shaft to provide for positively retaining said cam and said shaft in fixed relationship to each other and means including at least one plural electric switch mechanism of the plural-insulating-plunger-operated type removably attached to the inner end portion of said adapter member for support thereby.

2. A manually operated cam type rotary selector switch operating mechanism of the character defined by claim 1, wherein all of the plural electric switch mechanisms are of the normally open type.

3. A manually operated cam type rotary selector switch operating mechanism of the character defined by claim 1, wherein all of the plural electric switch mechanisms are of the normally closed type.

4. A manually operated cam type rotary selector switch operating mechanism of the character defined by claim 1, wherein certain of the plural electric switch mechanisms are of the normally open type and other of said switch mechanisms are of the normally closed type.

5. A manually operated cam type rotary selector switch operating mechanism of the character defined by claim 1, wherein a plurality of the plural electric switch mechanisms are connected endwise in tandem relationship to each other to thereby afford simultaneous control of the electric circuits associated therewith, depending upon the direction of movement or position of said operating button and the cam member attached thereto.

References Cited in the file of this patent

UNITED STATES PATENTS

| | | |
|---|---|---|
| 1,753,620 | Norviel | Apr. 8, 1930 |
| 1,857,875 | Salinas | May 10, 1932 |
| 1,977,887 | Murray | Oct. 23, 1934 |
| 2,357,971 | Robbins | Sept. 12, 1944 |
| 2,390,344 | Ayers et al. | Dec. 4, 1945 |
| 2,669,616 | Frank | Feb. 16, 1956 |
| 2,748,208 | Koertge | May 29, 1956 |